US008342755B2

(12) United States Patent
Nhep

(10) Patent No.: US 8,342,755 B2
(45) Date of Patent: Jan. 1, 2013

(54) FIBER OPTIC CONNECTOR AND METHOD FOR ASSEMBLING

(75) Inventor: Ponharith Nhep, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 131 days.

(21) Appl. No.: 12/755,133

(22) Filed: Apr. 6, 2010

(65) Prior Publication Data

US 2011/0002586 A1 Jan. 6, 2011

Related U.S. Application Data

(60) Provisional application No. 61/167,046, filed on Apr. 6, 2009.

(51) Int. Cl.
G02B 6/36 (2006.01)
(52) U.S. Cl. ........................................................ 385/78
(58) Field of Classification Search .................. 385/78
See application file for complete search history.

(56) References Cited

U.S. PATENT DOCUMENTS

| | | |
|---|---|---|
| 3,395,244 A | 7/1968 | Koehler |
| 4,050,783 A | 9/1977 | Tardy |
| 4,190,316 A | 2/1980 | Malsby et al. |
| 4,225,214 A | 9/1980 | Hodge et al. |
| 4,291,941 A | 9/1981 | Melzer |
| 4,309,071 A | 1/1982 | Prunier |
| 4,320,938 A | 3/1982 | Gunnersen et al. |
| 4,373,777 A | 2/1983 | Borsuk et al. |
| 4,645,296 A | 2/1987 | Cattin et al. |
| 4,652,082 A | 3/1987 | Warner |
| 4,807,958 A | 2/1989 | Gunner et al. |
| 4,842,363 A | 6/1989 | Margolin et al. |
| 5,037,175 A | 8/1991 | Weber |
| 5,073,044 A | 12/1991 | Egner et al. |
| 5,094,552 A | 3/1992 | Monroe et al. |
| 5,096,276 A | 3/1992 | Gerace et al. |
| 5,181,267 A | 1/1993 | Gerace et al. |
| 5,216,734 A | 6/1993 | Grinderslev |
| 5,222,169 A | 6/1993 | Chang et al. |
| 5,261,019 A | 11/1993 | Beard et al. |
| 5,278,928 A | 1/1994 | Ueda et al. |
| 5,293,582 A * | 3/1994 | Beard et al. ..................... 385/78 |
| 5,317,663 A | 5/1994 | Beard et al. |
| 5,321,784 A | 6/1994 | Cubukciyan et al. |
| 5,329,603 A | 7/1994 | Watanabe et al. |
| 5,347,603 A | 9/1994 | Belenkiy et al. |
| 5,390,272 A | 2/1995 | Repta et al. |

(Continued)

OTHER PUBLICATIONS

International Search Report and Written Opinion mailed Jul. 2, 2010.

(Continued)

*Primary Examiner* — Sung Pak
(74) *Attorney, Agent, or Firm* — Merchant & Gould P.C.

(57) ABSTRACT

A connector and method for assembling a connector. The connector includes a ferrule that is retainably engaged within a hub. The connector further includes a rear housing and a front housing. The front housing is sized to receive and rotationally retain the hub. The front housing has a bore that receives and engages the exterior surface of a rear housing. The front and rear housing include engagement members that allow the rear housing to be retained within the front housing. A grip housing slideably mounts to the front housing. A boot mounts to the rear housing and terminates before the grip. An inner passage of the rear housing includes a flared passage adjacent to the hub.

11 Claims, 15 Drawing Sheets

U.S. PATENT DOCUMENTS

| | | | |
|---|---|---|---|
| 5,461,690 A | 10/1995 | Lampert | |
| 5,530,787 A | 6/1996 | Arnett | |
| 5,640,476 A | 6/1997 | Womack et al. | |
| 5,671,310 A | 9/1997 | Lin et al. | |
| 5,710,851 A | 1/1998 | Walter et al. | |
| 5,720,907 A | 2/1998 | Anderson et al. | |
| 5,751,875 A | 5/1998 | Edwards et al. | |
| 5,778,126 A | 7/1998 | Saitoh | |
| 5,781,681 A | 7/1998 | Manning | |
| 5,862,282 A | 1/1999 | Matsuura et al. | |
| 5,883,995 A | 3/1999 | Lu | |
| 5,892,871 A | 4/1999 | Dahan et al. | |
| 5,915,056 A | 6/1999 | Bradley et al. | |
| 5,933,557 A | 8/1999 | Ott | |
| 5,953,476 A * | 9/1999 | Abe | 385/87 |
| 6,134,370 A | 10/2000 | Childers et al. | |
| 6,419,402 B1 * | 7/2002 | Zimmel | 385/86 |
| 6,428,215 B1 | 8/2002 | Nault | |
| 6,629,782 B2 * | 10/2003 | McPhee et al. | 385/78 |
| 6,695,489 B2 | 2/2004 | Nault | |
| 6,916,120 B2 | 7/2005 | Zimmel et al. | |
| 7,147,385 B2 | 12/2006 | Zimmel et al. | |
| 7,201,518 B2 | 4/2007 | Holmquist | |
| 7,371,082 B2 | 5/2008 | Zimmel et al. | |
| 7,452,137 B2 | 11/2008 | Droege et al. | |
| 7,530,745 B2 | 5/2009 | Holmquist | |
| 7,534,050 B2 | 5/2009 | Kachmar | |
| 7,677,812 B2 | 3/2010 | Castagna et al. | |
| 7,758,256 B2 | 7/2010 | Hopkins et al. | |
| 8,038,356 B2 * | 10/2011 | Marcouiller et al. | 385/78 |
| 2002/0081077 A1 | 6/2002 | Nault | |
| 2007/0292084 A1 | 12/2007 | Gurreri et al. | |
| 2010/0254663 A1 | 10/2010 | Hopkins et al. | |
| 2011/0002586 A1 | 1/2011 | Nhep | |

OTHER PUBLICATIONS

Figs 25-27 from U.S. Appl. No. 61/167,046 (admitted as prior art as of Apr. 6, 2009), 1 sheet.

Chapter Four: Passive Optical System Components for MDUs (MDU Engineering and Design Guide—ClearCurve Edition) 2007 Corning Cable Systems, 16 total pages.

* cited by examiner

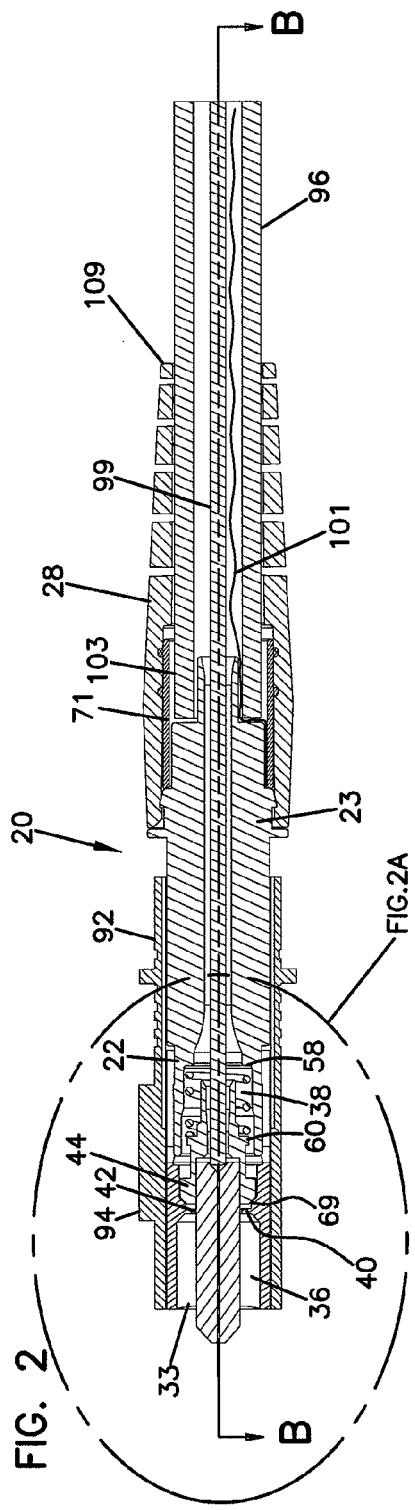
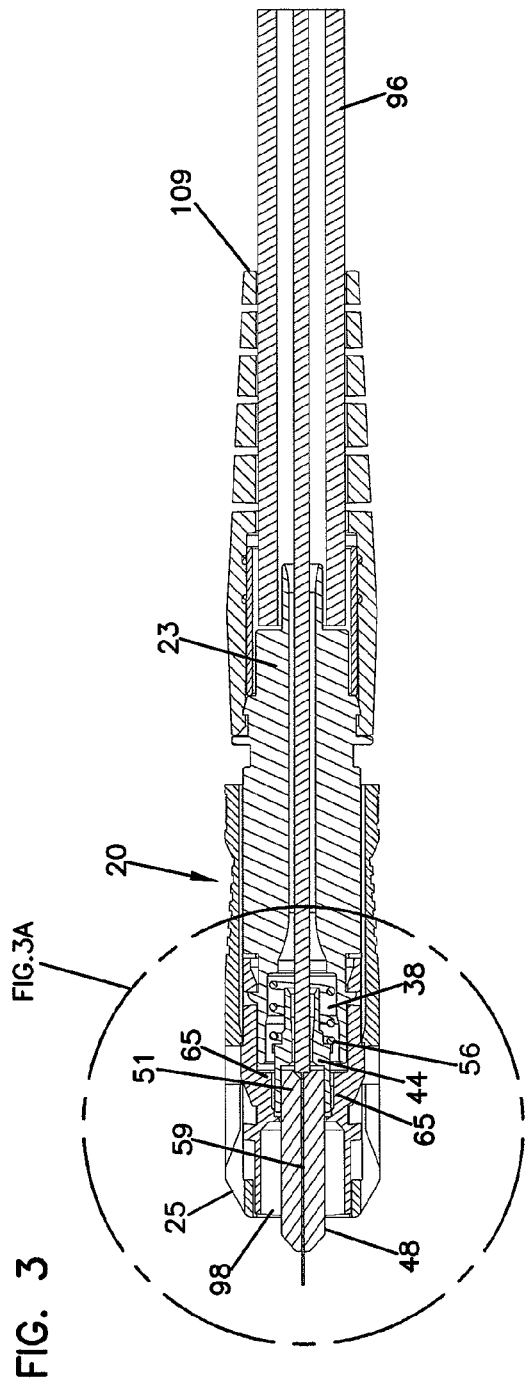

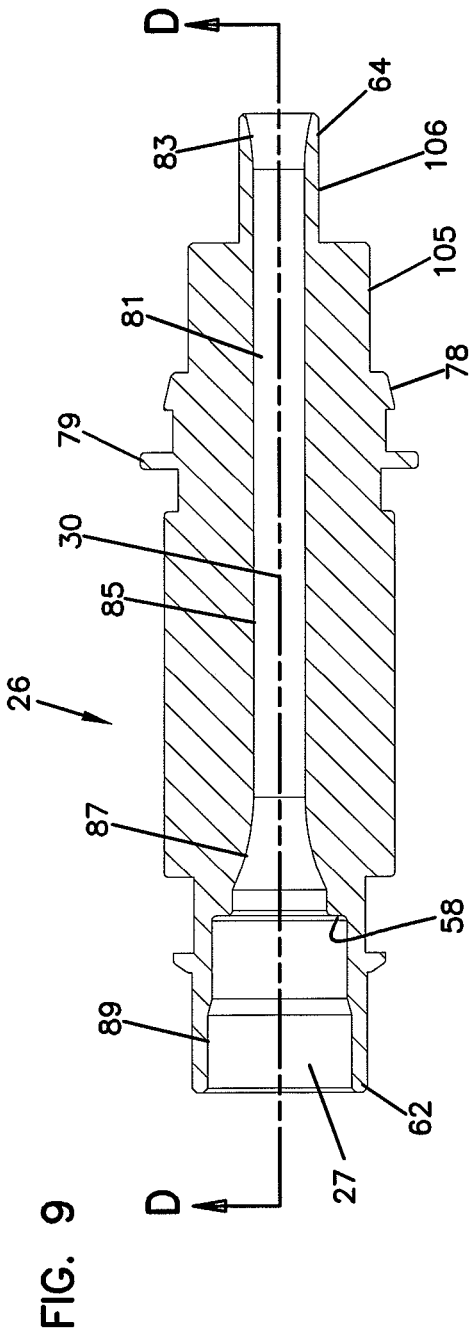
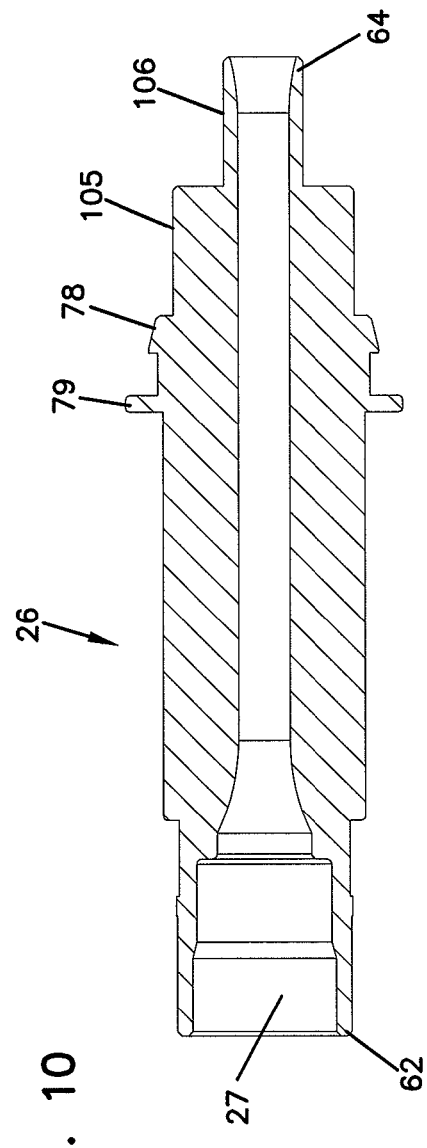
FIG. 9
FIG. 10

FIBER OPTIC CONNECTOR AND METHOD FOR ASSEMBLING

CROSS-REFERENCE TO RELATED APPLICATIONS

This application claims the benefit of U.S. Provisional Application Ser. No. 61/167,046, filed Apr. 6, 2009; which application is incorporated herein by reference.

FIELD OF THE INVENTION

The present invention relates to fiber optic connectors for use in optical fiber signal transmission systems, and to methods for assembling such fiber optic connectors.

BACKGROUND OF THE INVENTION

Fiber optic cables are used in the telecommunication industry to transmit light signals in high speed data and communication systems. A standard fiber optic cable includes a fiber with an inner light transmitting optical core. Surrounding the fiber typically is a reinforcing layer and an outer protective casing or jacket.

A fiber terminates at a fiber optic connector. Connectors are frequently used to non-permanently connect and disconnect optical elements in a fiber optic transmission system. There are many different fiber optic connector types. Some of the more common connectors are ST, FC and SC connectors. Small form factor connectors include LC and LX.5 (by ADC Telecommunications, Inc.).

A typical SC fiber optic connector includes a housing having a front end positioned opposite from a rear end. The front end of the SC connector housing is commonly configured to be inserted within an adapter. An example adapter is shown in U.S. Pat. No. 5,317,663, the disclosure of which is incorporated by reference. The SC connector typically further includes a ferrule that is positioned within the front and rear ends of the housing, and adjacent the front end. The ferrule is axially moveable relative to the housing, and is spring biased toward the front of the connector. The fiber optic cable has an end that is stripped. The stripped end includes a bare fiber that extends into the connector and through the ferrule.

A connector, such as the connector described above, is mated to another connector within an adapter like the adapter of U.S. Pat. No. 5,317,663. A first connector is received within the front portion of the adapter, and a second fiber is received within the rear portion of the adapter. When two connectors are fully received within an adapter, the ferrules (and hence the fibers internal to the ferrule) contact or are in close proximity to each other to provide for signal transmission between the fibers.

Another SC connector is shown in U.S. Pat. No. 6,428,215, the disclosure of which is incorporated by reference. The SC connector of U.S. Pat. No. 6,428,215 is tunable, if desired.

SUMMARY OF THE INVENTION

One aspect of the present invention relates to a fiber optic connector. The connector includes a ferrule that is retainably engaged within a hub. The connector further includes a rear housing and a front housing. The front housing and the rear housing are sized to receive the hub, the ferrule and a spring. The front housing has a bore that receives and engages the exterior surface of the rear housing. The front and rear housings include engagement members that allow the rear housing to be retained within the front housing. A grip housing mounts over the front housing for sliding relative movement. A strain relief boot mounts to the rear housing and terminates before the grip housing.

An interior passageway of the rear housing includes an entry end at a distal end connected to a main passage. A flared passage connects to the main passage at an opposite end. A spring passage at a proximal end is adjacent to the ferrule and hub, and connects to the flared passage. The main passage is sized to closely surround a 900 micron buffer coated fiber. The spring passage is wider than the main passage. The flared passage is positioned adjacent to the spring passage. The flared passage defines a flared shape connecting the main passage to the spring passage. Preferably, the flared passage is separated by a gap from the end of the hub of less than or equal to about 0.083 inches, and more preferably about 0.063 inches.

Another aspect of the present invention relates to a method for assembling a fiber optic connector including the above features. The location of the flared passage allows for easier passage of the fiber from the main passage to the ferrule during assembly. The strain relief boot does not occupy space within the grip housing as prior SC designs did, thereby allowing larger cables to be crimped to the rear housing.

A variety of advantages of the invention will be set forth in part in the description that follows, and in part will be apparent from the description, or may be learned by practicing the invention. It is to be understood that both the foregoing general description and the following detailed description are explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows:

FIG. 2 is a cross-sectional side view of the connector of FIG. 1 along lines A-A of FIG. 1;

FIG. 3 is a cross-sectional side view of the connector of FIG. 1 along lines B-B of FIG. 2;

FIG. 9 is a cross-sectional side view of the rear housing taken along lines C-C of FIG. 8;

FIG. 10 is a cross-sectional side view of the rear housing taken along lines D-D of FIG. 9;

DETAILED DESCRIPTION

Reference will now be made in detail to exemplary aspects of the present invention that are illustrated in the accompanying drawings. Where ever possible, the same reference numbers will be used throughout the drawings to refer to the same or like parts.

Figure 1:
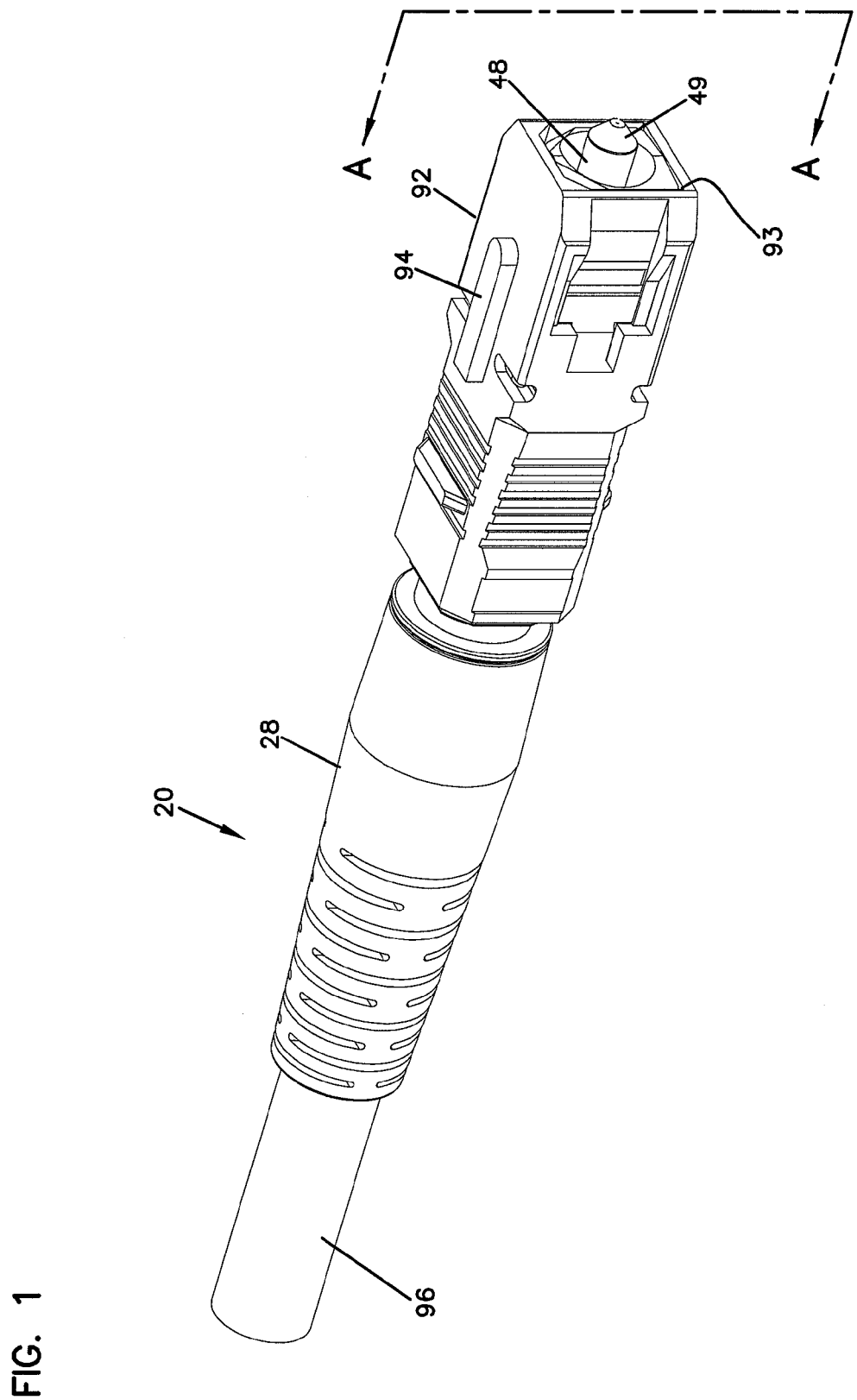
FIG. 1 is a front perspective view of an SC connector constructed in accordance with the principles of the present invention.
Figure 2A:
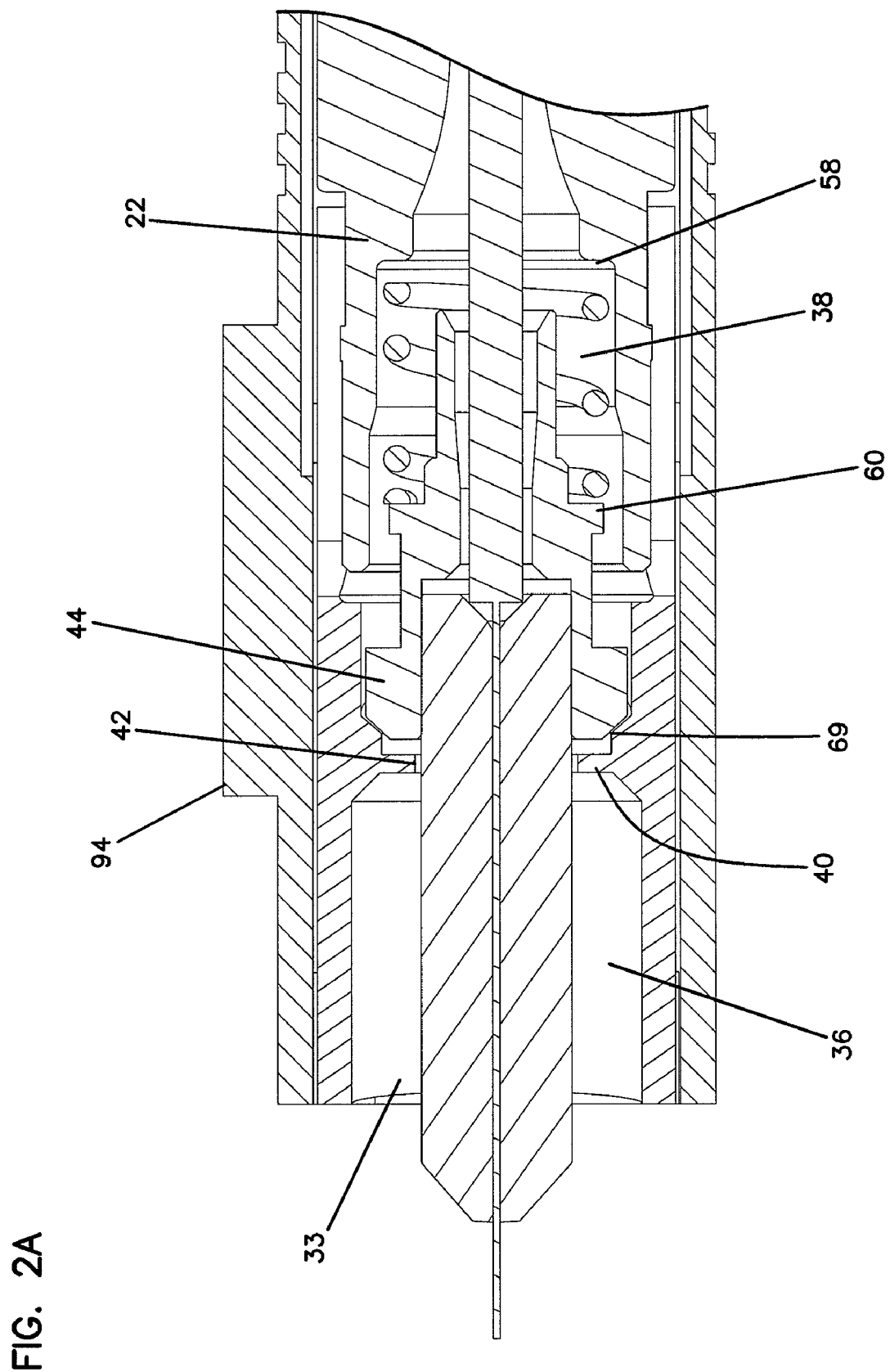
FIG. 2A is an enlarged cross-sectional side view of the front portion of the connector of FIG. 2.
Figure 3A:
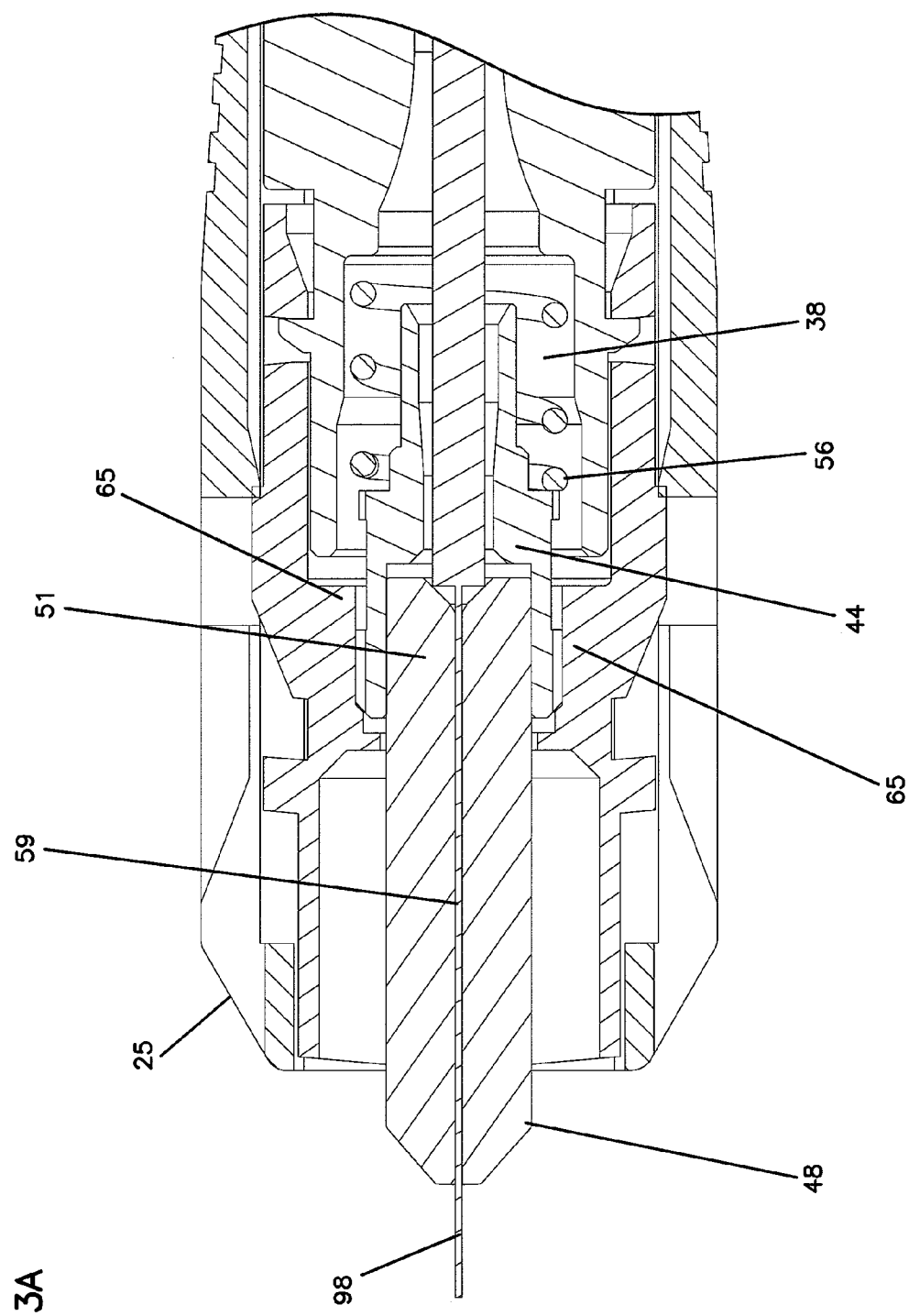
FIG. 3A is an enlarged cross-sectional side view of the front portion of the connector of FIG. 3.
Figure 4:
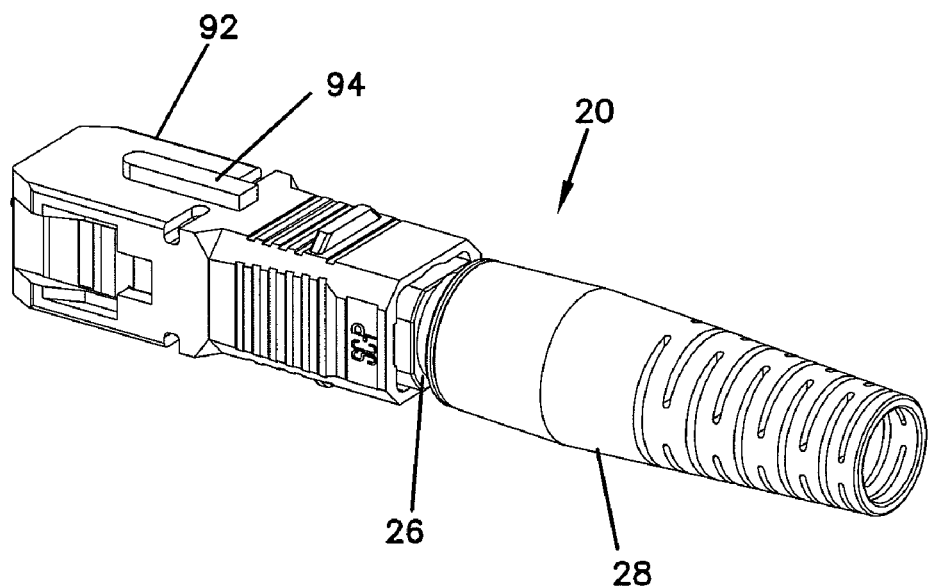
FIG. 4 is a rear perspective view of the connector of FIG. 1, without the cable shown.
Figure 6:
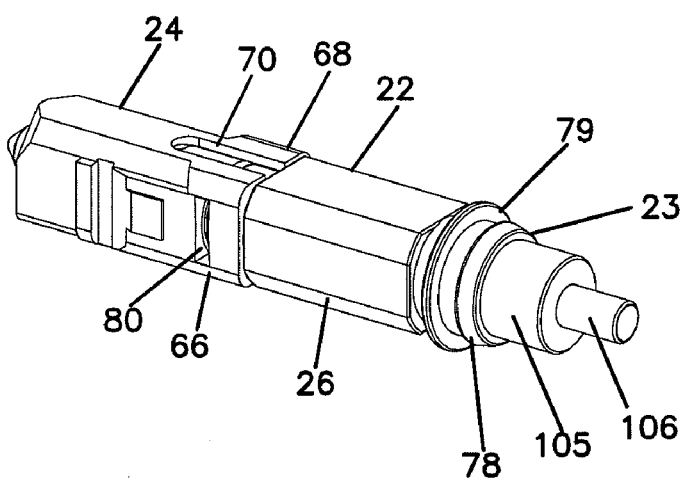
FIG. 6 is a rear perspective of the front and rear housings mounted together around the hub and ferrule.
Figure 5:
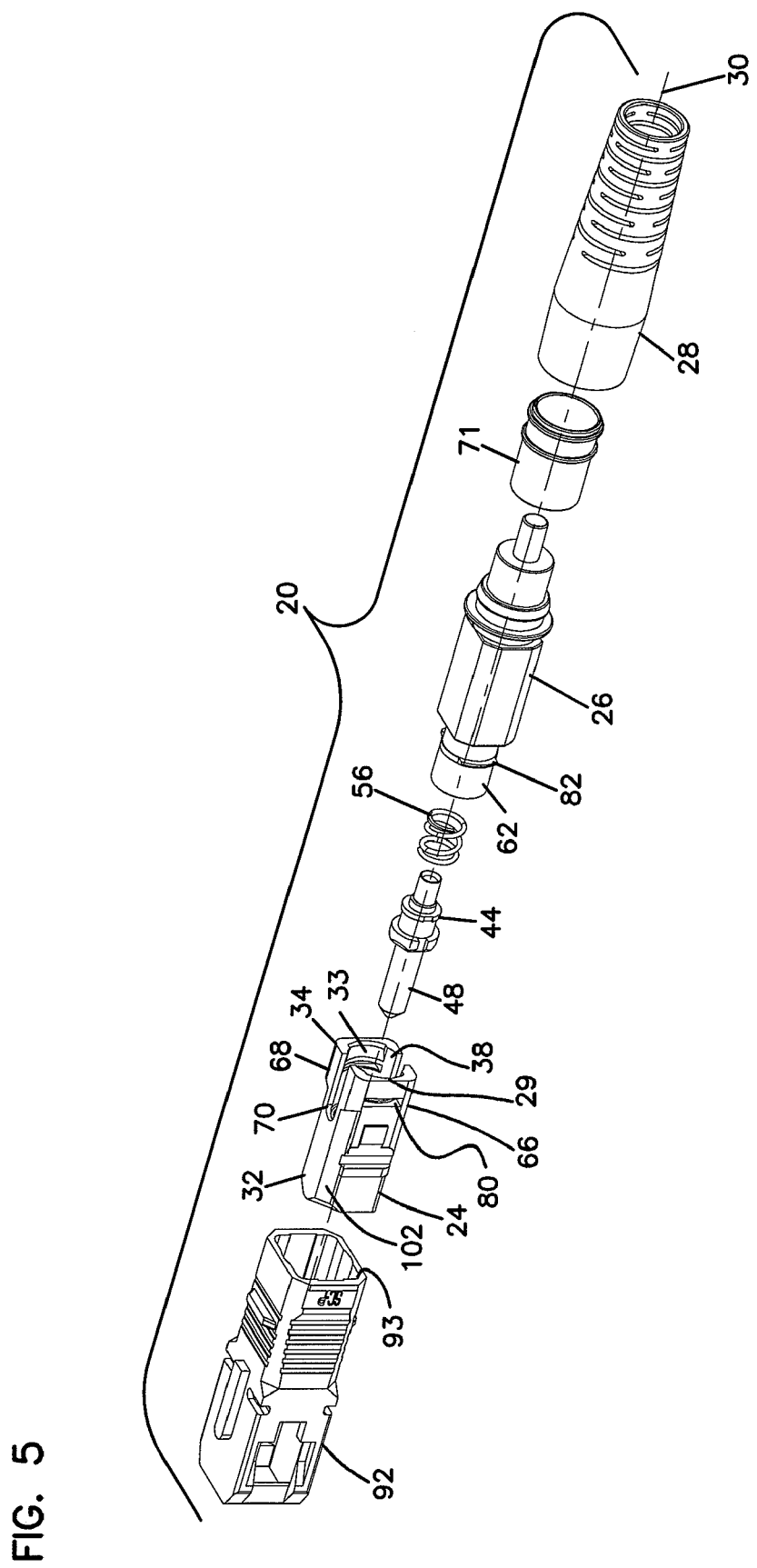
FIG. 5 is an exploded perspective view of the connector of FIG. 4.
Figure 7:
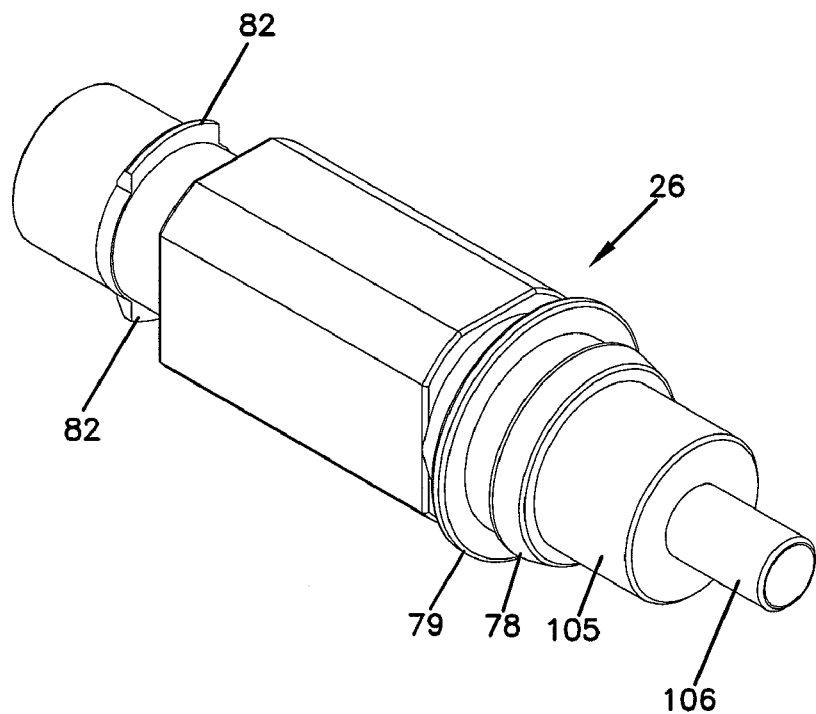
FIG. 7 is a rear perspective view of the rear housing.
Figure 8:
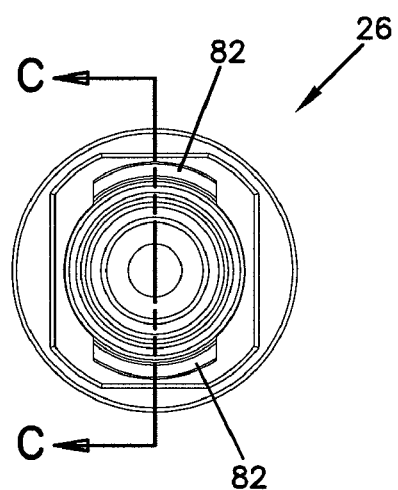
FIG. 8 is a front end view of the rear housing.
Figure 11:
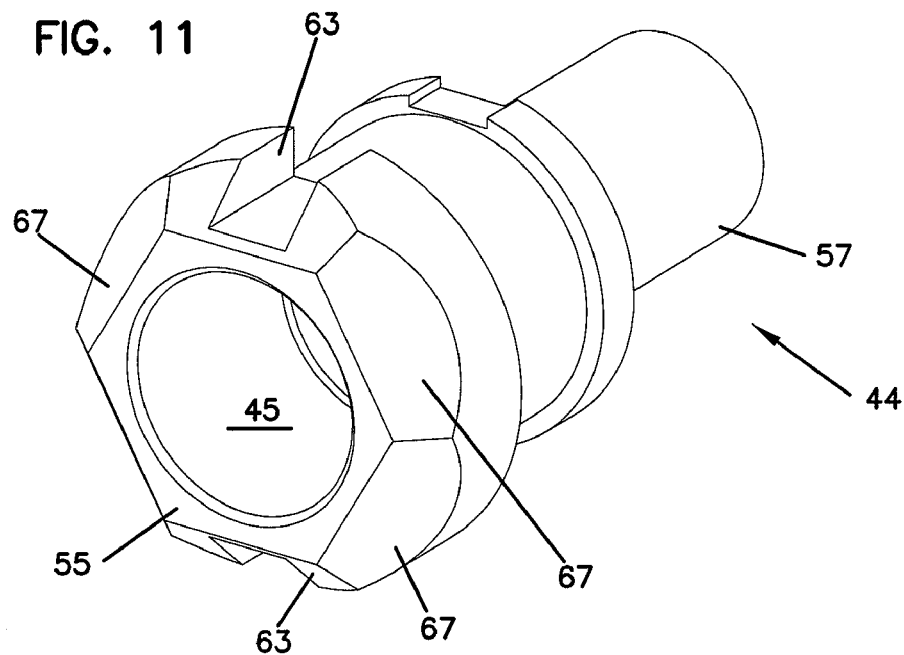
FIG. 11 is a front perspective view of the hub.
Figure 12:
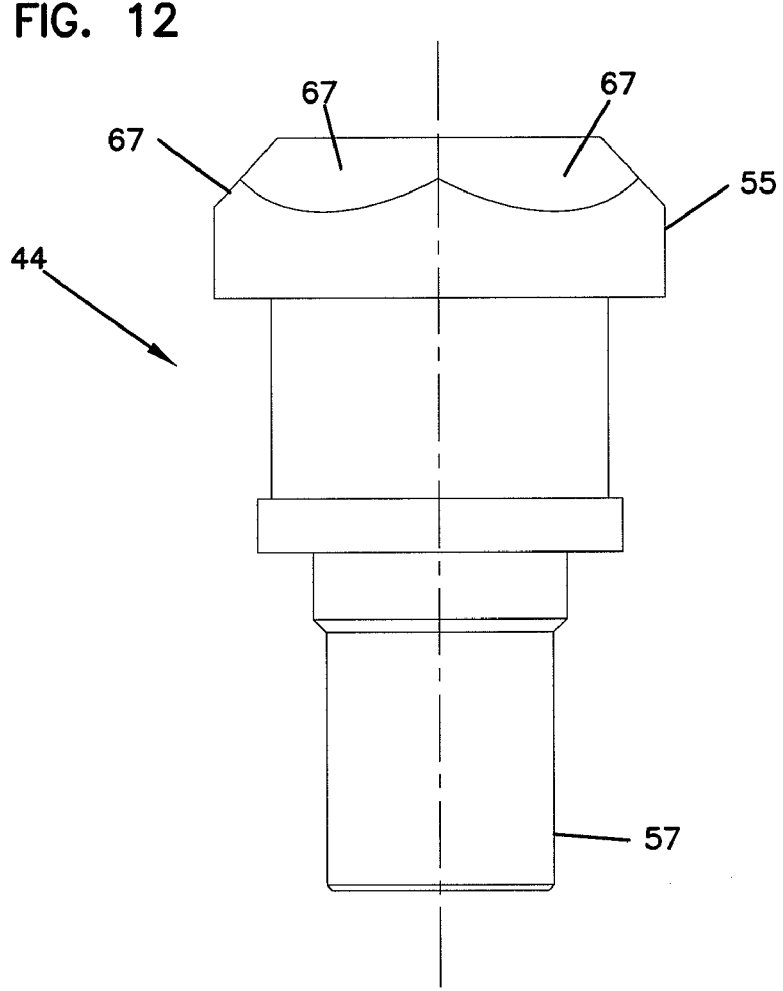
FIG. 12 is a side view of the hub.
Figure 13:
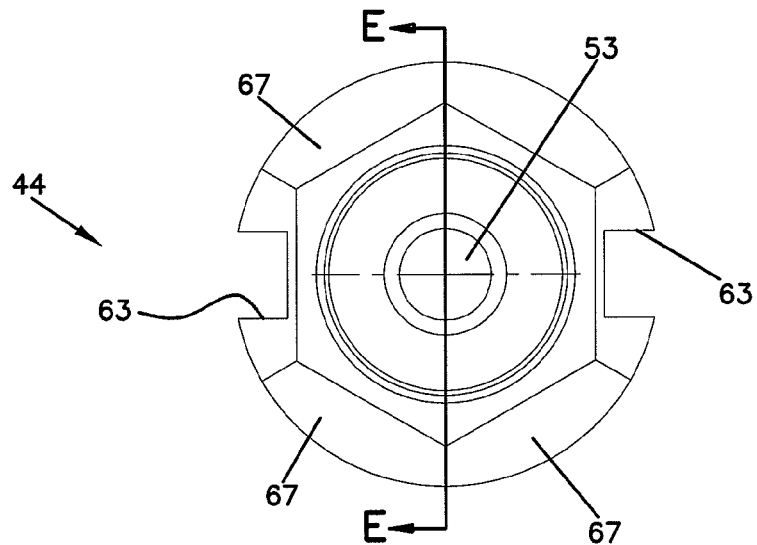
FIG. 13 is an end view of the hub.
Figure 14:
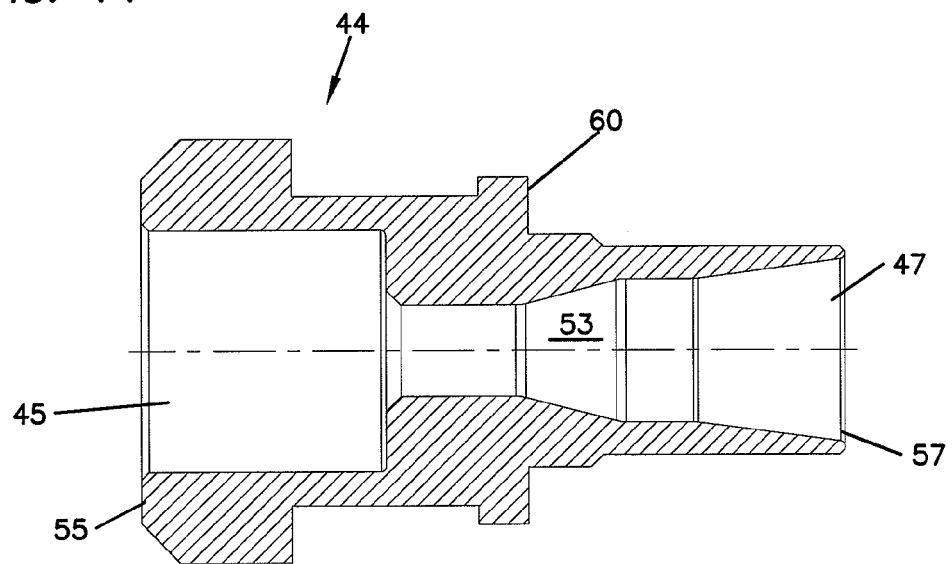
FIG. 14 is a cross-sectional side view of the hub taken along lines E-E of FIG. 13.
Figure 15:
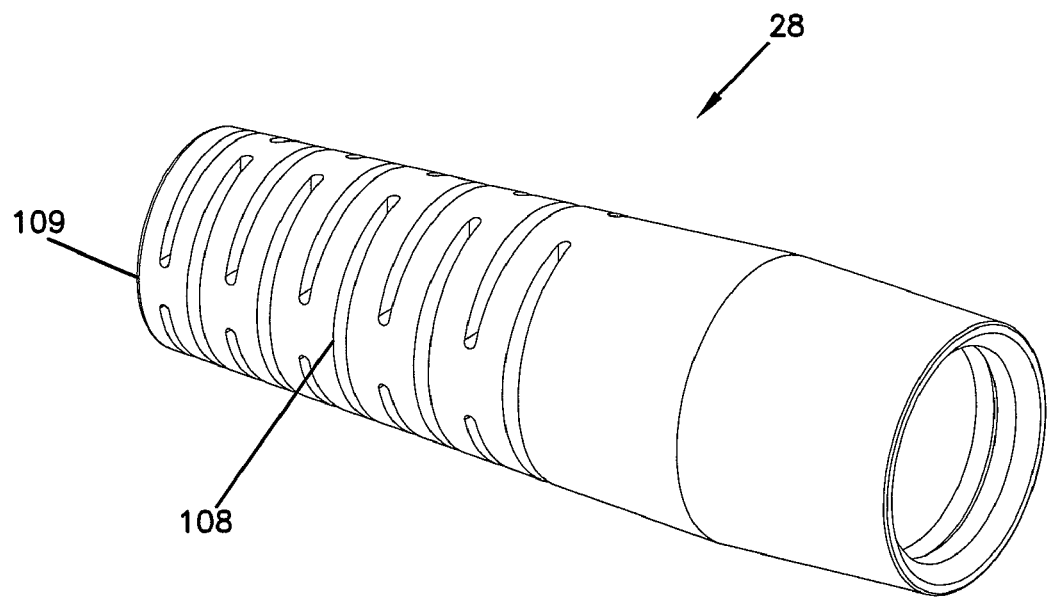
FIG. 15 is a front perspective view of the boot.
Figure 16:
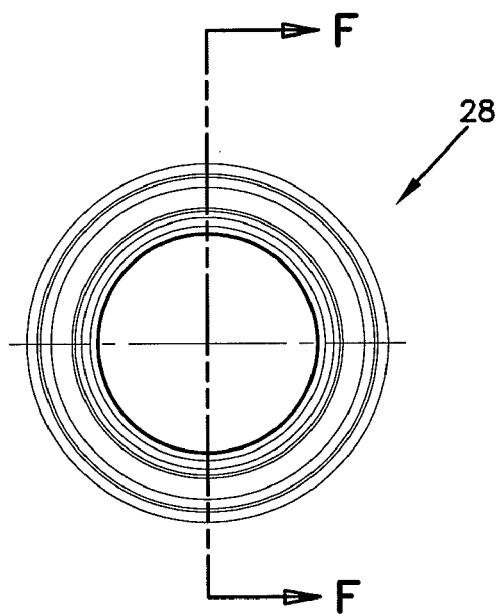
FIG. 16 is an end view of the boot.
Figure 17:
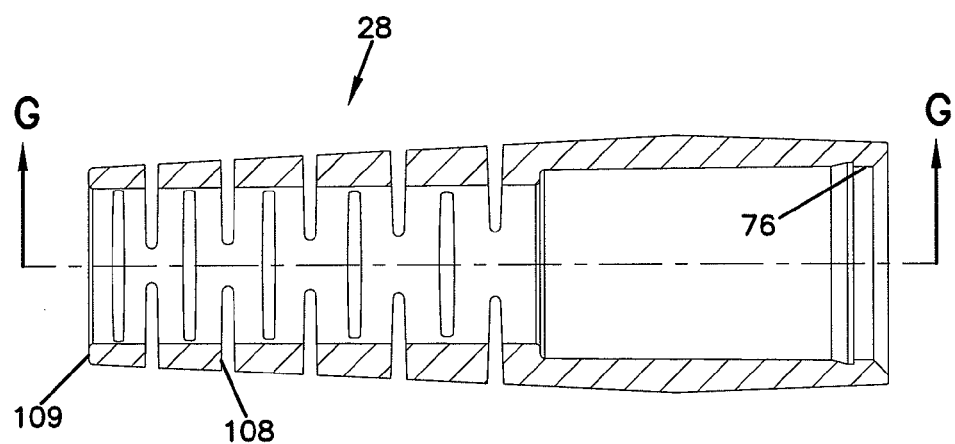
FIG. 17 is a cross-sectional side view of the boot taken along lines F-F of FIG. 16.
Figure 18:
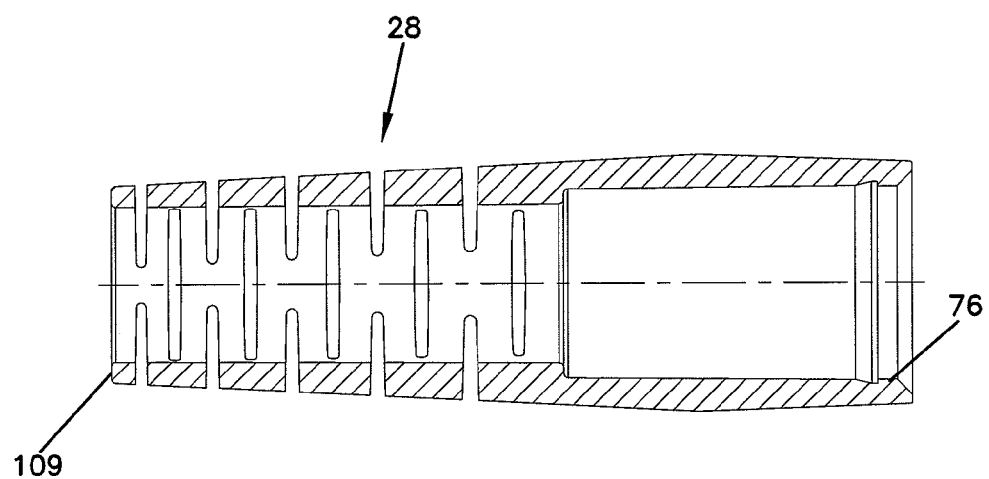
FIG. 18 is a cross-sectional side view of the boot taken along lines G-G of FIG. 17.
Figure 19:
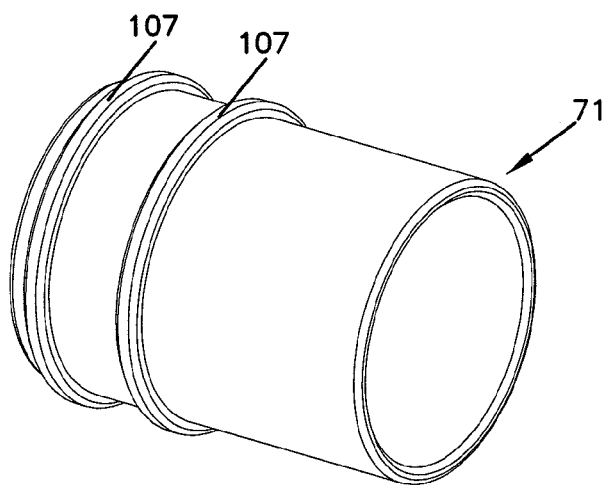
FIG. 19 is a front perspective view of the crimp sleeve.
Figure 20:
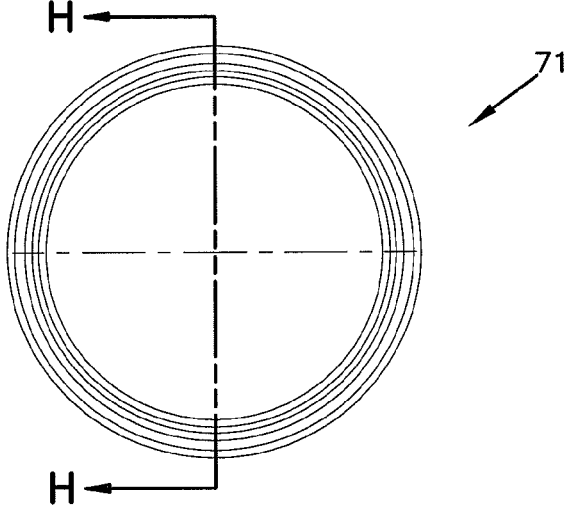
FIG. 20 is an end view of the crimp sleeve.
Figure 21:
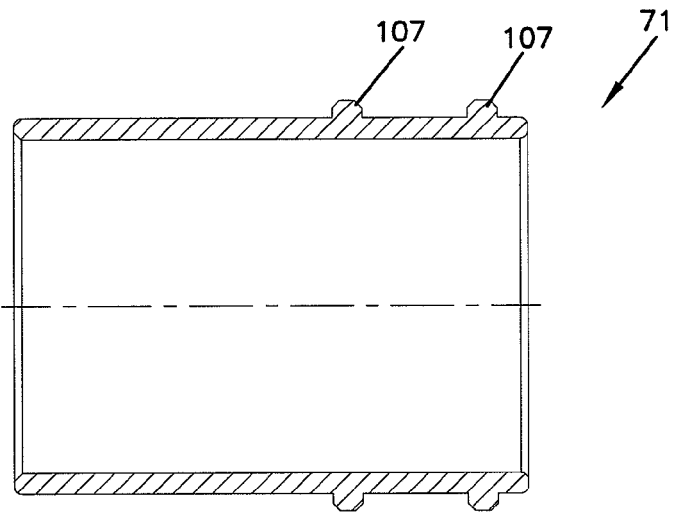
FIG. 21 is a cross-sectional side view of the crimp sleeve taken along lines H-H of FIG. 20.

FIGS. 1-6 illustrate an SC-type connector 20 constructed in accordance with the principles of the present invention. The connector 20 includes a housing 22 having a front housing 24 that connects to a rear housing 26. A strain relief boot 28 is mounted at the rear end 23 of the connector 20. The front portion 49 of a ferrule 48 is shown extending out the front end 25 of the connector 20. The ferrule 48 is mounted to a hub 44 which together are slidably mounted within the connector 20. Connector 20 also includes a slidable outer grip housing 92 located at the front of the housing 22 that is typically found on an SC-type connector. FIGS. 1-3 also show connector 20 mounted to a cable 96.

The front housing 24 of the connector 20 extends along a longitudinal axis 30 and includes a front end 32 positioned opposite from a rear end 34. The front housing 24 also defines a front chamber 36 and a rear chamber 38. A transverse wall 40 separates the front and rear chambers 36 and 38. An opening 42 centered about the longitudinal axis 30 is defined by the transverse wall 40. The front and rear ends 32 and 34 of the front housing 24 are open with a bore 33 formed therebetween extending along longitudinal axis 30.

Referring now to FIGS. 2, 3, 5 and 11-14, the connector 20 also includes a hub 44 positioned within the connector 20. The hub 44 is mounted to slide longitudinally along the axis 30 relative to the front housing 24. The hub 44 has openings 45 and 47 at its front and rear portions 55 and 57 with a bore 53 extending between the openings.

The hub 44 secures the ferrule 48. The ferrule 48 includes a rear portion 51 mounted within the front opening 45 defined by the hub 44. The ferrule 48 may be secured to the hub 44 using a conventional fastening technique, such as an epoxy adhesive. The hub 44 can also be mounted to the ferrule 48 with an interference fit or it can be molded around the ferrule 48. The ferrule 48 includes a bore 59 for receiving a bare optical fiber 98. The ferrule 48 extends along the longitudinal axis 30 from the hub 44 toward the front end 32 of the front housing 24. The ferrule 48 extends through the central opening 42 of the transverse wall 40 between the front and rear chambers 36 and 38 of the front housing 24, and protrudes out from the front end 25 of the connector 20. Typically, fiber 98 is epoxied to the ferrule 48.

The connector 20 further includes a coil spring 56 positioned within the rear chamber 38. The coil spring 56 surrounds the rear portion 57 of the hub 44 and is captured between a forwardly facing shoulder 58 formed by the rear housing 26 and a rearwardly facing shoulder 60 formed by the hub 44. The spring 56 functions to bias the hub 44 toward the front end 32 of the front housing 24. Because the ferrule 48 is connected to the hub 44, the spring 56 also functions to bias the ferrule 48 in a forward direction.

Referring now to FIGS. 2-10, the rear housing 26 also extends along longitudinal axis 30 and includes a front end 62 positioned opposite from a rear end 64. The hub 44 and surrounding spring 56 slide into the opening 27 at the front end 62 of the rear housing 26. The hub 44 and spring 56, however, are not mechanically fastened to the rear housing 26, and thus are free to move longitudinally along axis 30 with respect to the rear housing 26. The only limit placed on the rearward movement of the hub 44 and spring 56 into the rear housing 26 is the forward facing shoulder 58 on the rear housing 26 which, as mentioned above, engages the spring 56. The engagement of the spring 56 to the shoulder 58 functions to bias the hub 44 and connected ferrule 48 outwardly from the opening 27 at the front end 62 of the rear housing 26.

The front portion 55 of the hub 44 and the chamber 38 at the rear end 34 of the front housing 24 are sized and/or shaped so that the hub 44, when received within the housing 22, cannot be rotated. Likewise, the ferrule 48, which is secured to the hub 44, does not rotate relative to the housing 22 when the hub 44 is inserted therein. This can be achieved by having a non-circularly shaped hub 44 and a corresponding non-circularly shaped chamber 38 at the rear end 34 of the front housing 24. In the embodiment shown, slots 63 on the hub 44 and corresponding teeth 65 in chamber 38 of the front housing 24 prevent relative rotation at all times during use, including during rearward sliding movement. It can be appreciated that other configurations could be used which mount the hub 44 within the front and rear housings 24, 26 but not be rotatable once assembled. This allows for the fiber at end 49 of the ferrule 48 to be polished at an angle if desired. Hub 44 and front housing 24 also include front angled surfaces 67 on hub 44 and line or edge contacts 69 on front housing 24 as described in U.S. Pat. No. 6,916,120, the disclosure of which is incorporated by reference. These allow for more precise alignment if the connector is disconnected and reconnected to the adapter.

Further details of the front housing 24 can be seen in FIGS. 2-6. The rear portion 34 of the front housing 24 includes two extensions 66 and 68 that define the opening 29 at the rear portion 34. The extensions 66 and 68 also define two cut-outs 70 that extend longitudinally toward the front end 32 of the front housing 24 on two of the sides of the front housing 24. The cut-outs 70 give the extensions 66 and 68 a resiliency allowing them to be deflected outward when suitable pressure is applied from within the opening 29.

As noted above, the front housing 24 connects to the rear housing 26. The front end 62 of rear housing 26 is received into the opening 29 at the rear end 34 of the front housing 24. Two tabs 82 are positioned on the external surface of the rear housing 26. When the rear housing 26 is inserted into the opening 29 of the front housing 24, the tabs 82 press up against the extensions 66, 68. The tabs 82 snap into adjacent slots 80 formed in the front housing 24. When that occurs, the resilient extensions 66 and 68 quickly return to their natural positions, which secures the rear housing 26 to the front housing 24.

The connector 20 further includes grip housing 92. The connector housing 22 inserts into a bore 93 formed within the grip housing 92. The front housing 24 includes structure that mounts the connector housing 22 within the grip housing 92 as is known in the art. When the connector housing 22 is positioned within the grip housing 92, the grip housing 92 restrains the resilient extensions 66 and 68, preventing them from deflecting outward. The external surface of the connector housing 22 and the bore 93 of the grip housing 92 are configured such that the connector housing 22 can be fully inserted into the grip housing 92 in only one orientation. For example, see keyed front side surfaces 102 on the front housing 24, and a matching profile for bore 93. The external surface of the grip housing 92 includes a longitudinal key 94 that is sized to be received into a slot of an adapter (not shown), such as the adapter of U.S. Pat. No. 5,317,663, where the connector mates with a second SC-type connector.

An interior passageway 81 of the rear housing 26 receives an end of the cable 96 and includes an entry end 83 at a distal end connected to a main passage 85. A flared passage 87 connects to the main passage 85 at an opposite end. A spring passage 89 at a proximal end is adjacent to the ferrule and hub, and connects to the flared passage 87. The main passage 85 is sized to closely surround a 900 micron buffer coated fiber. The spring passage 89 is wider than the main passage 85. The flared passage 87 is positioned adjacent to the spring passage 89. The flared passage 87 defines a flared shape connecting the main passage 85 to the spring passage 89. Preferably, the flared passage is separated by a gap from the end of the hub of less than or equal to about 0.083 inches, and more preferably about 0.063 inches. Ferrule 48 and hub 44 can push back 0.078 inches to be flush with the front end of the connector 20.

Figure 26:
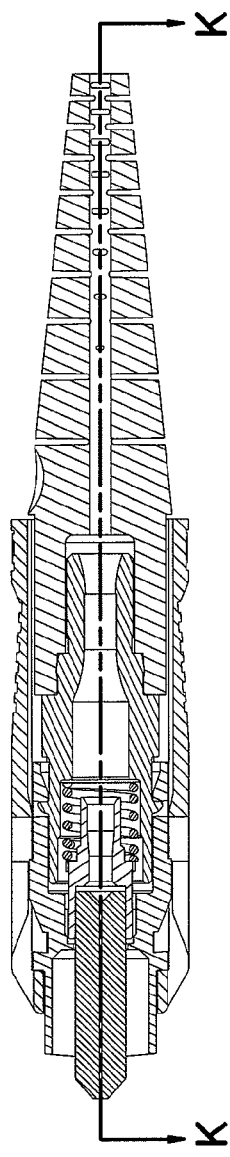
FIG. 26 is a cross-sectional side view of the connector of FIG. 25 taken along lines J-J of FIG. 25.
Figure 27:
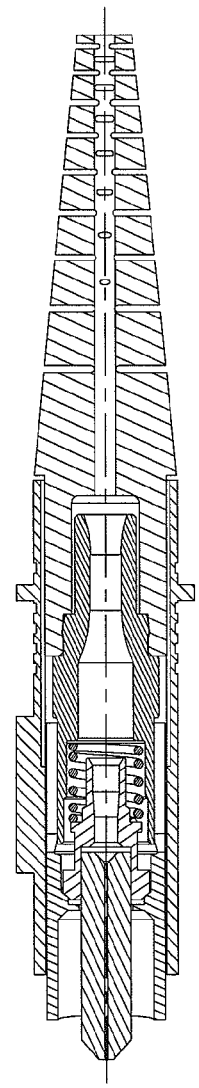
FIG. 27 is a cross-sectional side view of the connector of FIG. 25 taken along lines K-K of FIG. 26.
Figure 25:
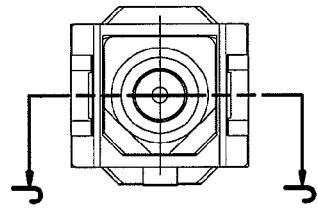
FIG. 25 is an end view of a prior art SC connector.

One goal of the flared shape is that it generally defines a surface that does not damage the bare fiber as it is pushed axially from the rear end 23 toward the ferrule 48. Sharp transitions and edges could cause burrs or cutting surfaces that could nick the fiber during insertion. By moving the flared shape fairly close to the hub 44, there is less chance for the fiber to drift away from the longitudinal axis 30 and become misaligned during insertion. Compare the flared passage 87 with the cross-sections of a prior art SC design as shown in FIGS. 25-27. Preferably, main passage 85 is at 0.060 inches in diameter. Flared passage 87 extends from 0.060 inches in diameter to 0.109 inches in diameter.

As shown in FIGS. 1-4 and 15-21, connector 20 includes an internal crimp ring 71 for crimping the housing 22 to an end of cable 96. The external boot 28 is snapped onto the housing 22. Note that the boot 28 and the grip housing 92 do not overlap. The exterior shape of the grip housing 92 is a standard well-known SC type connector shape useable with mating SC adapters.

The present invention is further directed to a method for assembling the SC-type connector described above. The ferrule 48 is first mounted within the opening 45 formed in the front portion 55 of the hub 44. The spring 56 is then positioned over the rear portion 57 of the hub 44, and together these are inserted into the rear end 34 of the front housing 24. Next, the rear housing 26 is snapped into the front housing 24, thereby retaining the hub 44 and ferrule 48 (and spring 56) within the connector housing 22. This connection is made to prevent movement of the rear housing 26 relative to the front housing 24. As mentioned above, the front portion 55 of the hub 44 is sized and shaped so that when it is inserted into the front housing 24, the hub 44 (and connected ferrule 48) cannot rotate relative to the front rear housings 24, 26.

At this point, a fiber optic cable 96, having a central bare fiber 98, is attached to the connector 20 using conventional techniques well known in the art. This includes stripping the end of the cable 96 to expose the fiber 98. The fiber 98 is then fed into the connector 20 all the way through passage 81 including flared passage 87 and into the bore 59 in the ferrule 48. The fiber may be either mechanically or adhesively retained within the ferrule 48. The buffer coated portion 99 of the fiber (typically 900 microns) extends through the connector 20 up to the ferrule 48. A reinforcement layer 101 (such as aramid yarn) of the fiber optic cable 96 is crimped with the crimp sleeve 71. An outer jacket 103 of cable 96 is also crimped to the rear housing by the crimp sleeve 71. The rear housing 26 has a first crimp surface 105 for the reinforcing layer 101. First crimp surface 105 is preferably textured for improved gripping of the reinforcing layer, such as with knurling. The rear housing 26 has a second crimp surface 106 for the outer jacket 103. The crimp sleeve 71 includes one or more crimp rings 107 to improve gripping of the jacket 103. Crimp rings 107 project outwardly on crimp sleeve 71. Crimp rings 107 provide localized gripping on the jacket 103.

Figure 22:
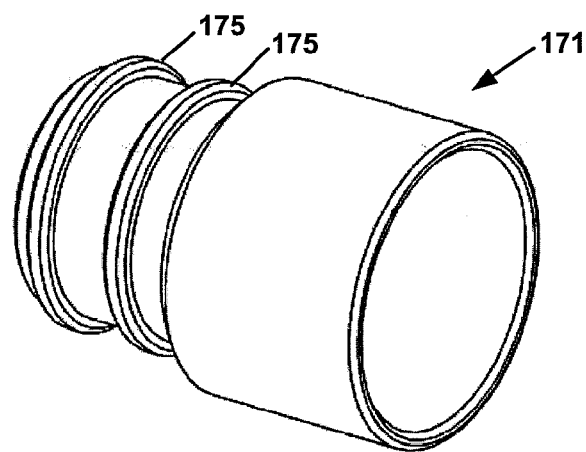
FIG. 22 is a front perspective view of an alternative crimp sleeve for a smaller cable.
Figure 23:
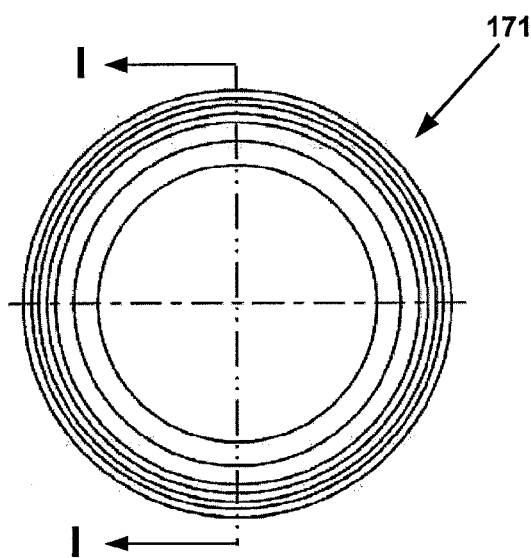
FIG. 23 is an end view of the crimp sleeve of FIG. 22.
Figure 24:
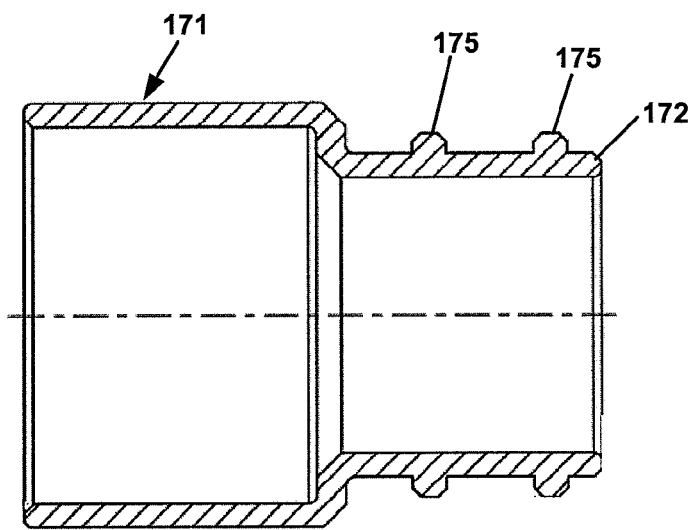
FIG. 24 is a cross-sectional side view of the crimp sleeve of FIG. 22 taken along lines I-I of FIG. 23.

In the illustrated embodiment, cable 96 is a 5 millimeter cable. For smaller cables, a different crimp sleeve 171 can be used with a smaller rear end 172 as shown in FIGS. 22-24. Similar crimp rings 175 to rings 107 can be used. For example, a cable with a 3.6 millimeter outer dimension can be used with crimp sleeve 71. In some cases, a different boot 28 may be needed to more closely surround cable 96 at distal end 109. For still smaller cables, smaller rear ends 172 can be provided.

The boot 28 is positioned over the crimp sleeve 71 and helps provide strain relief. Slots 108 in boot 28 provide flexibility. The boot 28 is attached to the rear housing 26 by snapping a circumferential lip 76 over a circumferential tab 78. Note that boot 28 terminates before grip 92. A stop 79 prevents boot from being slid too far toward the grip housing 92. In this manner, larger cables 96 can be used than connectors of the type shown in U.S. Pat. No. 6,428,215, noted above. The exposed bare fiber at the front end 49 of the ferrule 48 may then be removed and polished. The connector housing 22 is inserted within the grip housing 92. The connector 20 can then be inserted into an adapter (not shown) for mating with a second SC-type connector.

It is anticipated that connector housing 22 can be used with a variety of cable sizes. As noted above, cable 96 can be 5.0 millimeters, or 3.6 millimeters. Other sizes are anticipated where only the crimp sleeves 71, 171 and rear ends 109 of boots 28 would vary. Cable sizes that are anticipated include 1.7 millimeter, 2.0 millimeter and 3.0 millimeter. Also, connector 20 can be used with 900 micron cables, that have no reinforcing members.

With regard to the foregoing description, it is to be understood that changes may be made in detail, especially in matters of the construction materials employed and the shape, size and arrangement of the parts without departing from the scope of the present invention. It is intended that the specification and depicted aspects be considered exemplary only, with a true scope and spirit of the invention being indicated by the broad meaning of the following claims.

What is claimed is as follows:

1. A fiber optic connector comprising:
   a ferrule;
   a hub retainably engaging the ferrule;
   a one-piece rear housing having an external surface and a bore for receiving the hub;

a front housing having a bore with an internal surface for receiving and engaging the external surface of the rear housing, the front housing rotationally retaining the hub; and an engagement member on each of the front and rear housings, wherein the rear housing is mounted within the front housing;

a spring biasing the hub toward the front housing;

wherein the front housing has a key element, and wherein the connector further includes a grip housing with a corresponding key element mating with the front housing key element;

a strain relief boot snap mounted to the rear housing and in a non-overlapping position relative to the grip housing;

wherein the connector is an SC-type connector, and wherein the rear housing defines a crimp surface on the external surface of the rear housing, the fiber optic connector further comprising a crimp sleeve configured to crimp a reinforcing layer of a fiber optic cable terminated to the fiber optic connector against the crimp surface of the rear housing, wherein when the strain relief boot is snap mounted to the rear housing, the strain relief boot extends forwardly enough to completely cover the crimp surface of the rear housing.

2. The connector of claim 1, further comprising a stop between the grip housing and the strain relief boot on the rear housing.

3. The connector of claim 1, wherein the bore of the front housing has a noncircular configuration, and the hub has an external surface with a corresponding noncircular configuration, wherein the non-circular configurations are defined by a projecting tooth and a mating slot arrangement.

4. The connector of claim 1, wherein the crimp sleeve includes two rings on an exterior of the crimp sleeve.

5. The connector of claim 1, wherein the bore of the rear housing includes a spring passage, a flared passage adjacent to the spring passage, and a main passage smaller than the spring passage, wherein the flared passage is between the spring passage and the main passage, wherein the flared passage is separated from a front end of the hub by a distance less than or equal to 0.083 inches.

6. An SC fiber optic connector comprising:
a ferrule having a front end and an opposite rear end;
a hub retainably engaging the ferrule;
an inner housing having a first part and a second part, wherein the hub is rotationally retained by the first part, the inner housing having a front end and a rear end, the front end of the ferrule positioned adjacent the front end of the inner housing, the hub longitudinally movable relative to the inner housing;
a spring biasing the hub toward the front end of the inner housing; and
a crimp surface on the rear end of the inner housing, the crimp surface defined on an exterior surface of the inner housing, a crimp sleeve configured to crimp a reinforcing layer of a fiber optic cable terminated to the SC fiber optic connector against the crimp surface of the inner housing;
an outer housing engageable with the inner housing, wherein the outer housing is slideable relative to the inner housing;
a strain relief boot mounted to the inner housing in non-overlapping relation to the outer housing, wherein when the strain relief boot is mounted to the inner housing, the strain relief boot extends forwardly enough to completely cover the crimp surface of the inner housing.

7. A method of assembling a fiber optic connector, the method comprising the steps of:
providing a ferrule extending from a hub, the hub retainably engaging the ferrule;
positioning the hub within a bore of a front housing to prevent rotational movement of the hub with respect to the front housing;
inserting a one-piece rear housing into a bore of the front housing, the rear housing defining a crimp surface on an exterior of the rear housing; and
inserting the front housing within a grip housing;
mounting a strain relief boot to the rear housing, wherein the boot does not overlap with the grip housing;
crimping a reinforcing layer of a fiber optic cable to the crimp surface of the rear housing a crimp sleeve, wherein when the strain relief boot is mounted to the rear housing, the strain relief boot extends forwardly enough to completely cover the crimp surface of the rear housing.

8. The method of claim 7, wherein the connector is an SC-type connector.

9. A fiber optic device comprising:
a connector having a hub retainably engaging a ferrule, a front housing rotationally retaining the hub, the front housing having a bore for receiving and engaging a one-piece rear housing, and an engagement mechanism between the front and rear housing;
a boot engaging the rear housing;
a grip housing engaging the front housing;
a fiber optic cable connected to the connector, the cable including a fiber extending through the connector;
a crimp sleeve crimping a reinforcing layer of the cable, and a jacket of the cable to an exterior crimp surface of the rear housing;
wherein the boot and the grip housing do not overlap, wherein the boot extends forwardly enough to completely cover the exterior crimp surface of the rear housing.

10. The device of claim 9, wherein the connector is an SC-type connector.

11. The device of claim 9, wherein the crimp sleeve includes two rings on an exterior of a cylindrical body.

* * * * *